(12) United States Patent
Yokoyama et al.

(10) Patent No.: US 7,922,336 B2
(45) Date of Patent: Apr. 12, 2011

(54) LIGHT SOURCE DEVICE FOR DISPLAY DEVICE, DISPLAY DEVICE, AND METHOD FOR ADJUSTING IMAGE OF DISPLAY DEVICE

(75) Inventors: Toshifumi Yokoyama, Osaka (JP); Ken'ichi Kasazumi, Osaka (JP)

(73) Assignee: Panasonic Corporation, Osaka (JP)

( * ) Notice: Subject to any disclaimer, the term of this patent is extended or adjusted under 35 U.S.C. 154(b) by 722 days.

(21) Appl. No.: 11/885,208

(22) PCT Filed: Feb. 28, 2006

(86) PCT No.: PCT/JP2006/303728
§ 371 (c)(1),
(2), (4) Date: Aug. 28, 2007

(87) PCT Pub. No.: WO2006/093134
PCT Pub. Date: Sep. 8, 2006

(65) Prior Publication Data
US 2008/0143976 A1    Jun. 19, 2008

(30) Foreign Application Priority Data

Mar. 1, 2005  (JP) .................................. 2005-055534

(51) Int. Cl.
*G03B 21/22* (2006.01)
(52) U.S. Cl. ................ 353/71; 353/69; 353/70; 353/74; 353/85; 353/15; 353/119; 353/78; 353/121; 348/789; 348/785; 348/786; 348/836; 348/839; 372/38.05; 372/29.013; 372/87; 372/46.01; 372/28; 372/32; 372/69; 359/623; 359/707
(58) Field of Classification Search .................... 353/69, 353/70, 71, 85, 15, 74, 78, 119, 121; 372/38.05, 372/29.013, 87, 46.01, 43.01, 28, 32, 69; 348/789, 785, 786, 836, 839; 250/214 AL, 205
See application file for complete search history.

(56) References Cited

U.S. PATENT DOCUMENTS 5,285,287 A    2/1994 Shikama
(Continued)

FOREIGN PATENT DOCUMENTS
JP          3-1673          1/1991
(Continued)

OTHER PUBLICATIONS

Patent Cooperation Treaty (PCT) International Preliminary Report on Patentability, Jun. 6, 2006.

*Primary Examiner* — Georgia Y Epps
*Assistant Examiner* — Sultan Chowdhury
(74) *Attorney, Agent, or Firm* — Wenderoth, Lind & Ponack, L.L.P.

(57) ABSTRACT

A light source device for a display device for projecting an image on a screen is provided, the light source device for display device including a light source unit operable to output light; an image outputting unit operable to output an image by giving an image signal to the light; and a control circuit operable to switch the image output from the image outputting unit between a normal image and a mirror reversed image formed by reversing the normal image right and left by controlling the image signal, such that outputting type is switched between a front projection in which the image is projected onto the screen from a front on the same side as the viewing side, and a rear projection in which the image is projected onto the screen from a rear plane on the opposite side to the viewing side.

25 Claims, 11 Drawing Sheets

U.S. PATENT DOCUMENTS

| | | | |
|---|---|---|---|
| 5,742,358 A * | 4/1998 | Iijima et al. | 348/789 |
| 6,616,283 B1 * | 9/2003 | Takano et al. | 353/74 |
| 7,425,073 B2 * | 9/2008 | Wood et al. | 353/28 |
| 7,593,151 B2 * | 9/2009 | Yokoyama et al. | 359/216.1 |
| 7,643,524 B2 * | 1/2010 | Mizuuchi et al. | 372/38.05 |
| 2003/0021320 A1 * | 1/2003 | Kan | 372/46 |
| 2003/0039036 A1 * | 2/2003 | Kruschwitz et al. | 359/707 |
| 2004/0239889 A1 * | 12/2004 | Inamoto | 353/69 |
| 2006/0087628 A1 * | 4/2006 | Dvorkis et al. | 353/121 |
| 2007/0120983 A1 * | 5/2007 | Yamamoto et al. | 348/208.99 |
| 2008/0225361 A1 * | 9/2008 | Kasazumi et al. | 359/15 |

FOREIGN PATENT DOCUMENTS

| | | |
|---|---|---|
| JP | 5-40318 | 2/1993 |
| JP | 6-59239 | 3/1994 |
| JP | 6-138431 | 5/1994 |
| JP | 6-160797 | 6/1994 |
| JP | 7-162790 | 6/1995 |
| JP | 8-50331 | 2/1996 |
| JP | 8-194202 | 7/1996 |
| JP | 11-344683 | 12/1999 |
| JP | 2003-149733 | 5/2003 |
| JP | 2003-149733 A * | 5/2003 |
| JP | 2003-215562 | 7/2003 |
| JP | 2004-247984 | 9/2004 |
| JP | 2004-347984 | 12/2004 |

* cited by examiner

20

LINEAR PATTERN

7

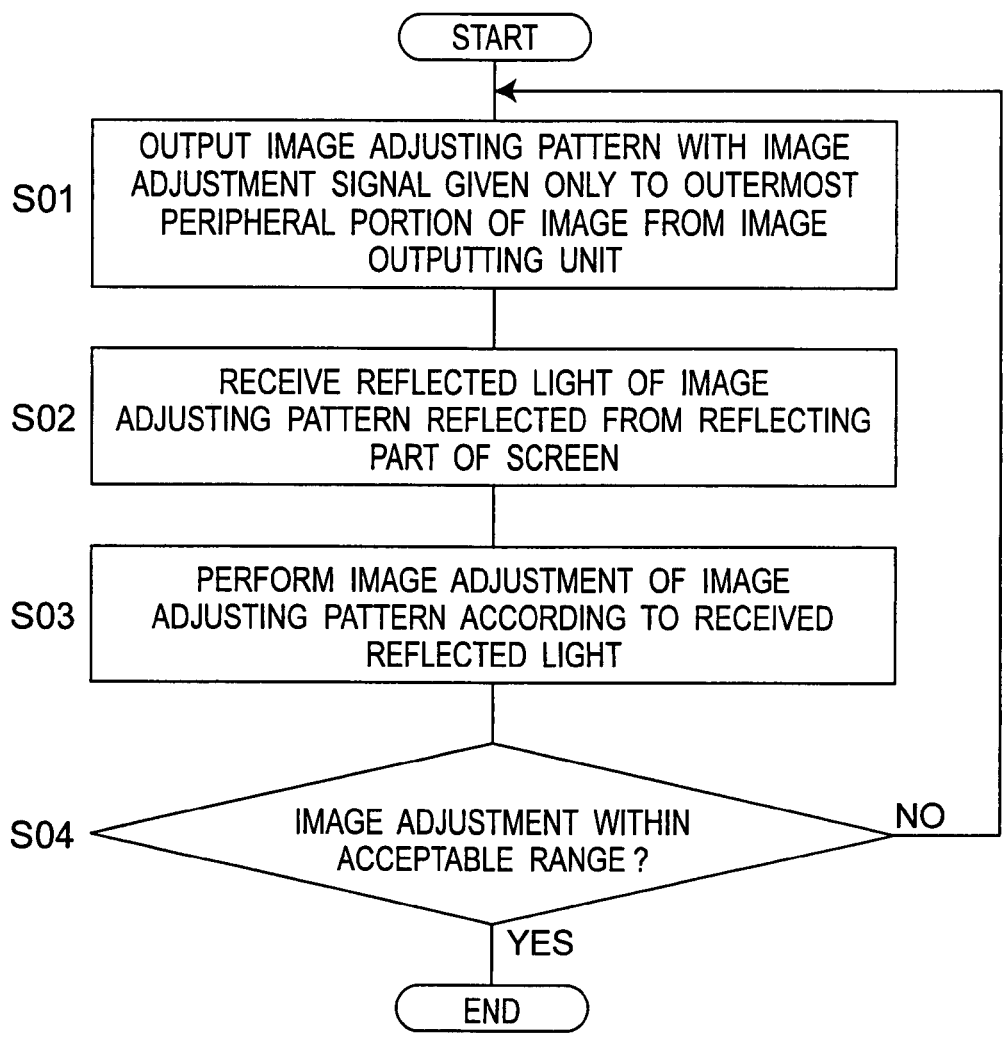

LIGHT SOURCE DEVICE FOR DISPLAY DEVICE, DISPLAY DEVICE, AND METHOD FOR ADJUSTING IMAGE OF DISPLAY DEVICE

BACKGROUND OF THE INVENTION

I. Technical Field

The present invention relates to a display device including a light source device and a screen, in particular, to a light source device for a display device capable of being separated from the display device and used alone. Furthermore, the present invention relates to a method for adjusting an image of the display device.

II. Description of Related Art

FIG. 10 is a schematic view showing one example of a conventional portable display device. A lamp 51 is accommodated in a light source device 50. The white light output from lamp 51 is branched into lights of red, green, and blue using optical filters 54a to 54g, wave combined by a prism 56 after being transmitted through a liquid crystal panel 55, transmitted through a lens 57, and projected onto a screen 58 to be produced as an image.

FIG. 11 is a schematic view showing equipment that can be connected to the conventional display device as shown in Japanese Patent Laid-open Publication No. 2003-215562 (FIG. 1). An image signal is input in the display device of the conventional example through an RGB terminal. In addition, any equipment having the output terminal for the RGB signal can be connected to the display device. For example, personal computer 201, such as notebook PC, video game machine 202, optical disc player 203, such as various types of DVD, optical disc recorder 204, including VTR all-in-one type, camera integrated VTR 205, stationary VTR 206, BS/CS tuner 207, TV 208, hard disc recorder 209, including all-in-one of various types of optical disc drives, Internet broadcasting Set Top Box (STB) 210, CATV STB 211, terrestrial digital broadcasting STB 212, BS HDTV broadcasting STB 213, and the like may be connected to the display device. Moreover, the display device may include D4 input terminal, DVI-D input terminal, IEEE 1394 terminal, component terminal, S terminal, video terminal, and the like arranged in accordance with the format of the signal output from the equipment connected to the display device.

Since a lamp is used as a light source, the power consumption is large and the power supply from a plug outlet is necessary for portable use in the conventional configuration. The device is also too large. Furthermore, the conventional front projection type display device only has a function of front projection, and cannot be used as a rear projection type device. Thus, a wide space is necessary in the projection. In addition, the screen for the front projection type display device only has the function of receiving the irradiated light from the display device, and the image adjustment must be performed by a user.

Another problem is speckle noise generated when a coherent light source (e.g., laser) is used as a light source. When projecting laser light or coherent light on a screen to produce an image, the laser light reflected from the screen interferes, thereby generating the speckle noise. The image appears as glaring and contrast is produced in the image due to the speckle noise. Consequently, the quality of the projected image becomes lower, which makes an observer uncomfortable and causes tiredness, and thus greatly lowers the product's value.

SUMMARY OF THE INVENTION

The present invention aims to provide a light source device for a display device that can be used in both front projection and rear projection, and that excels in portability, and a display device incorporating such a light source device. A further object is to provide a light source device for a display device in which the speckle noise specific to laser light is reduced when laser light is used as a light source, and a display device incorporating such light source device. Furthermore, another object is to provide a display device capable of automatically performing image adjustment.

A light source device for display device of the present invention is a light source device for a display device for projecting an image on a screen, the light source device including:

a light source unit operable to output light;

an image outputting unit operable to output an image by giving an image signal to the light; and a control circuit operable to switch the image output from the image outputting unit between a normal image and a mirror reversed image formed by reversing the normal image right and left by controlling the image signal, such that outputting type is switched between a front projection in which the image is projected onto the screen from a front plane on the same side as the viewing side, and a rear projection in which the image is projected onto the screen from a rear plane on the opposite side to the viewing side.

A projecting unit operable to project the normal image or the mirror reversed image output from the image outputting unit onto the screen may be further arranged. The control circuit may further include a switch operable to switch between front projection and rear projection. Under what condition the light source device is being used is definitely determined by the switch.

Furthermore, the control circuit can output the normal image or the mirror reversed image from the image outputting unit in response to the state of the switch.

Moreover, the control circuit can perform trapezoidal correction or image adjustment in the vertical and horizontal directions on the image to be projected onto the screen by controlling the image signal given at the image outputting unit.

The control circuit can switch the projecting light output according to projection type between front projection and rear projection. The control circuit can switch the projecting light output according to the surrounding brightness.

The light source unit may include a semiconductor laser. High frequency superposition may be applied to the semiconductor laser. The speckle noise can be reduced by applying high frequency superposition. The semiconductor laser may be a self exciting type semiconductor laser. The speckle noise can also be reduced by using the self exciting type semiconductor laser.

A voice outputting unit operable to output voice may be further arranged. A communication unit may be further arranged.

The control circuit may output a monochromatic pattern signal. The control circuit may output an image pattern signal for notifying a critical situation in the time of a disaster.

A drive battery may also be arranged. As a battery drive can be performed, and outdoor use is facilitated. In this case, the control circuit can switch the light output according to the remaining amount of the battery. Long-time use is thereby realized by the battery.

A display device according to the present invention includes the light source device; and a screen operable to display an image projected from the light source device.

A positioning unit operable to position the relative position of the light source device and the screen may be further arranged. The exit light from the light source device is accurately irradiated on the screen by the positioning unit.

The screen may include a reflecting part for reflecting the image from the light source device. Image adjustment by the reflecting part is facilitated. The reflecting part may be arranged at an outermost periphery of the screen.

The image outputting unit of the light source device can output an image adjusting pattern with an image adjustment signal given to the outermost periphery of the image from the image outputting unit.

The light source device may further include a light receiving unit operable to receive light reflected from the reflecting part of the screen. In this case, the control circuit can perform image adjustment of the image adjusting pattern output from the image outputting unit according to the reflected light received by the light receiving unit.

The switch of the light source device recognizes the display device when the light source device is incorporated as a component of the display device, and switches various settings. The outputting type of the light source device may be switched between front projection and rear projection according to the display device by the switch.

An input keyboard may be further arranged. A charging unit for charging the light source device may be further arranged. The light source device thus can be immediately used even when separated from the display device.

An image adjustment method of the display device according to the present invention is an image adjustment method for adjusting the image projected on a screen in a display device equipped with a light source device including a light source unit operable to output light, an image outputting unit for outputting an image by giving an image signal to the light, and a control circuit operable to switch the image output from the image outputting unit between a normal image and a mirror reversed image formed by reversing the normal image right and left by controlling the image signal; and a screen operable to display the image projected from the light source device; the method including:

outputting an image adjusting pattern with an image adjustment signal given only to the outermost peripheral portion of the image from the image outputting unit of the light source device;

receiving a reflected light of the image adjusting pattern reflected from the reflecting part of the screen;

performing image adjustment of the image adjusting pattern according to the received reflected light; and repeating from the step of outputting the image adjusting pattern to the step of performing the image adjustment, until the image adjustment is within the predetermined acceptable range.

The image adjustment signal pattern may be a square pattern having straight lines.

According to the light source device for display device according to the present invention, it can be used in either front projection or rear projection by switching between the normal image and the mirror reversed image in the image outputting unit, and projecting the image to the screen. A compact display device having small power consumption is achieved by using a semiconductor laser light source for the light source unit, and can be used as a stand-alone light source device separate from the screen. Battery drive thereby becomes possible, and portability is extremely facilitated. The speckle noise caused by using the laser light can be reduced by using the semiconductor laser applied with high frequency superposition or self exciting type semiconductor laser as a light source unit, thus a clear image can be viewed. Since the screen can also be carried around, the images can be viewed at all places.

The display device according to the present invention incorporates the light source device. The control circuit of the light source device includes a switch operable to recognize the display device when the light source device is incorporated as a component of the display device, the switch may also switch various settings of the light source device. The image can be projected onto the screen by switching between a normal image and a mirror reversed image according to the display device, when the image projected onto the screen in the display device is different from the image projected onto the screen when the light source device is used alone.

Since a substrate for charging the display device may be arranged in the display device, the light source device can be used for a long time even if separated and used alone after being used incorporated in the display device. Furthermore, a space for placing the screen is sufficient to view the display image. The image can be viewed on a large screen by spacing the light source device from the screen in use.

Furthermore, in the method of adjusting the image in the display device according to the present invention, the step of outputting the image adjusting pattern to the step of performing image adjustment are repeated, until the image adjustment is in an acceptable range. The image signal is thus subjected to appropriate trapezoidal correction, and a non-deformed image can be projected onto the screen.

BRIEF DESCRIPTION OF THE DRAWINGS

FIG. 8 is a flowchart of a method for adjusting the image of the display device according to the second embodiment of the present invention.

DETAILED DESCRIPTION OF THE INVENTION

Figure 1:
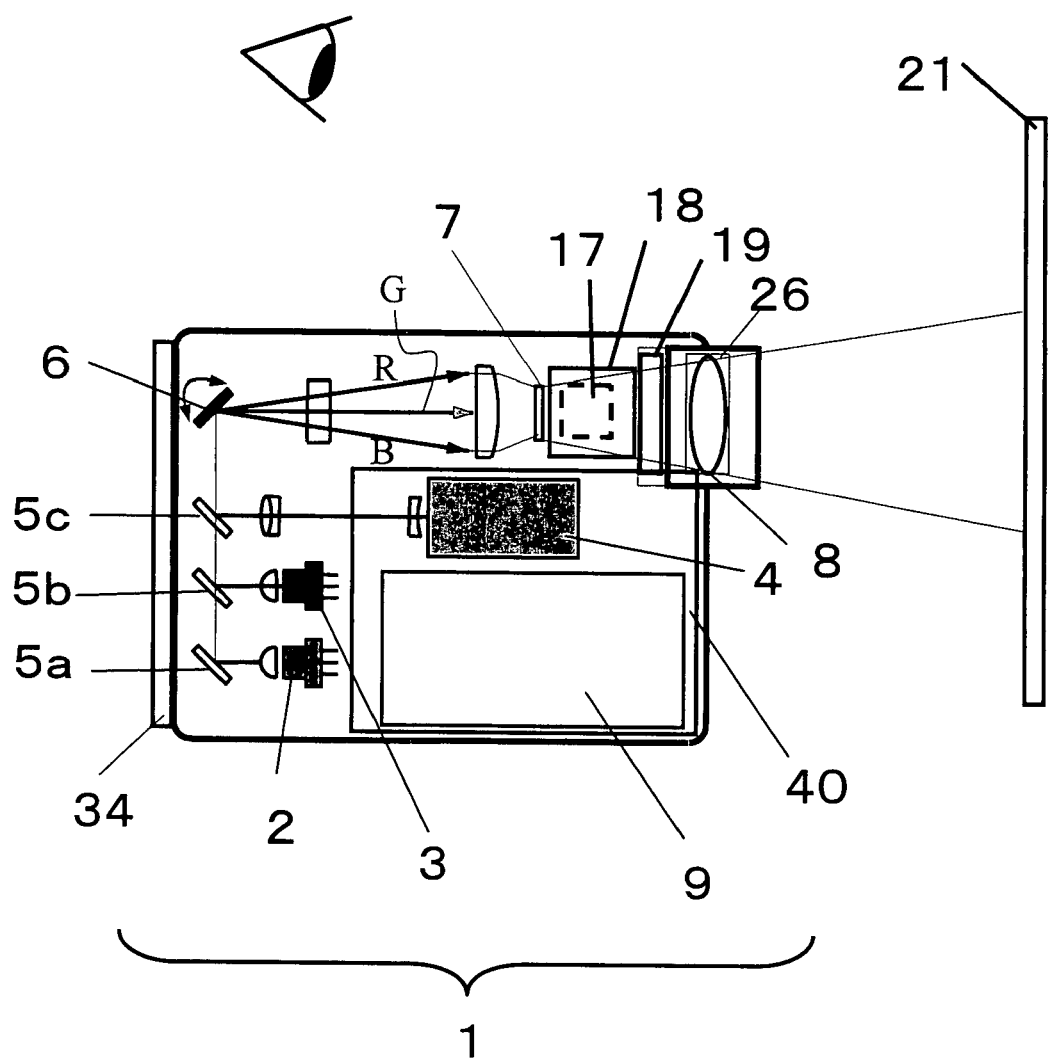
FIG. 1 is a schematic view showing a configuration of a light source device for a display device according to a first embodiment of the present invention, showing one example of when used as a front projection type.

A light source device for a display device, a display device, and a method for adjusting an image in the display device according to the present embodiment will now be described using the accompanying figures. The same reference characters are denoted for substantially the same components throughout the drawings.

First Embodiment

Figure 2:
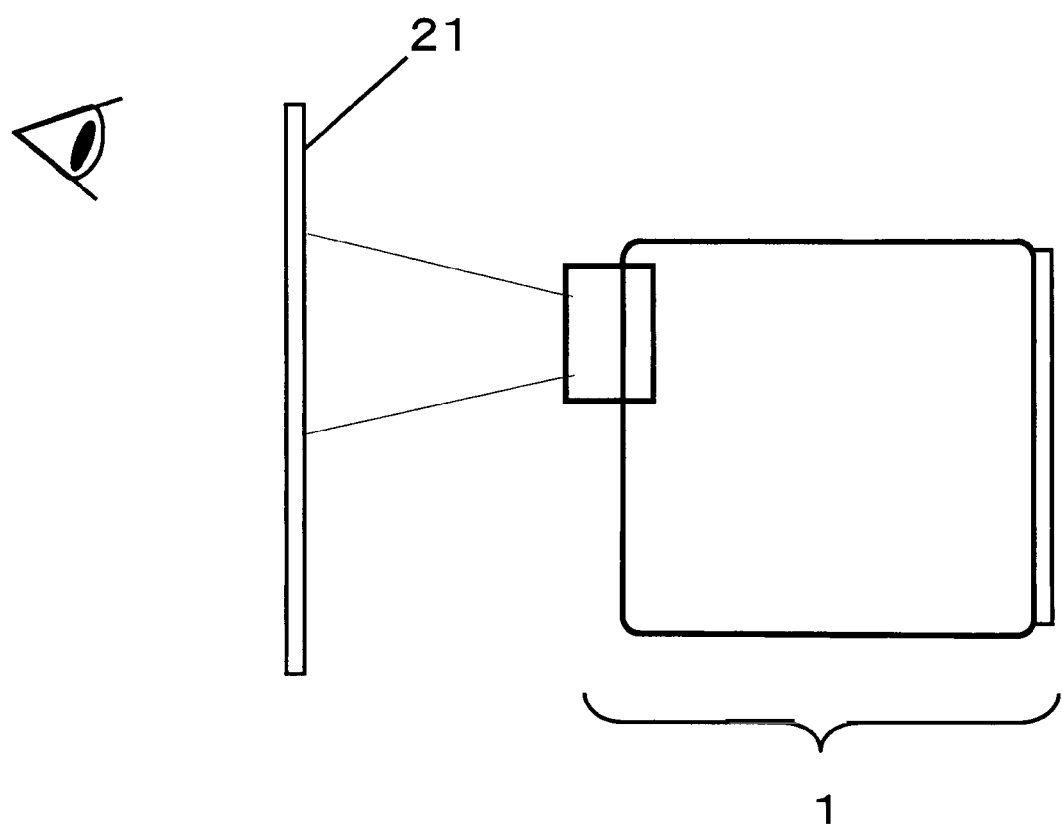
FIG. 2 is a schematic view showing one example of when using the light source device for a display device according to the first embodiment of the present invention as a rear projection type.
Figure 3:
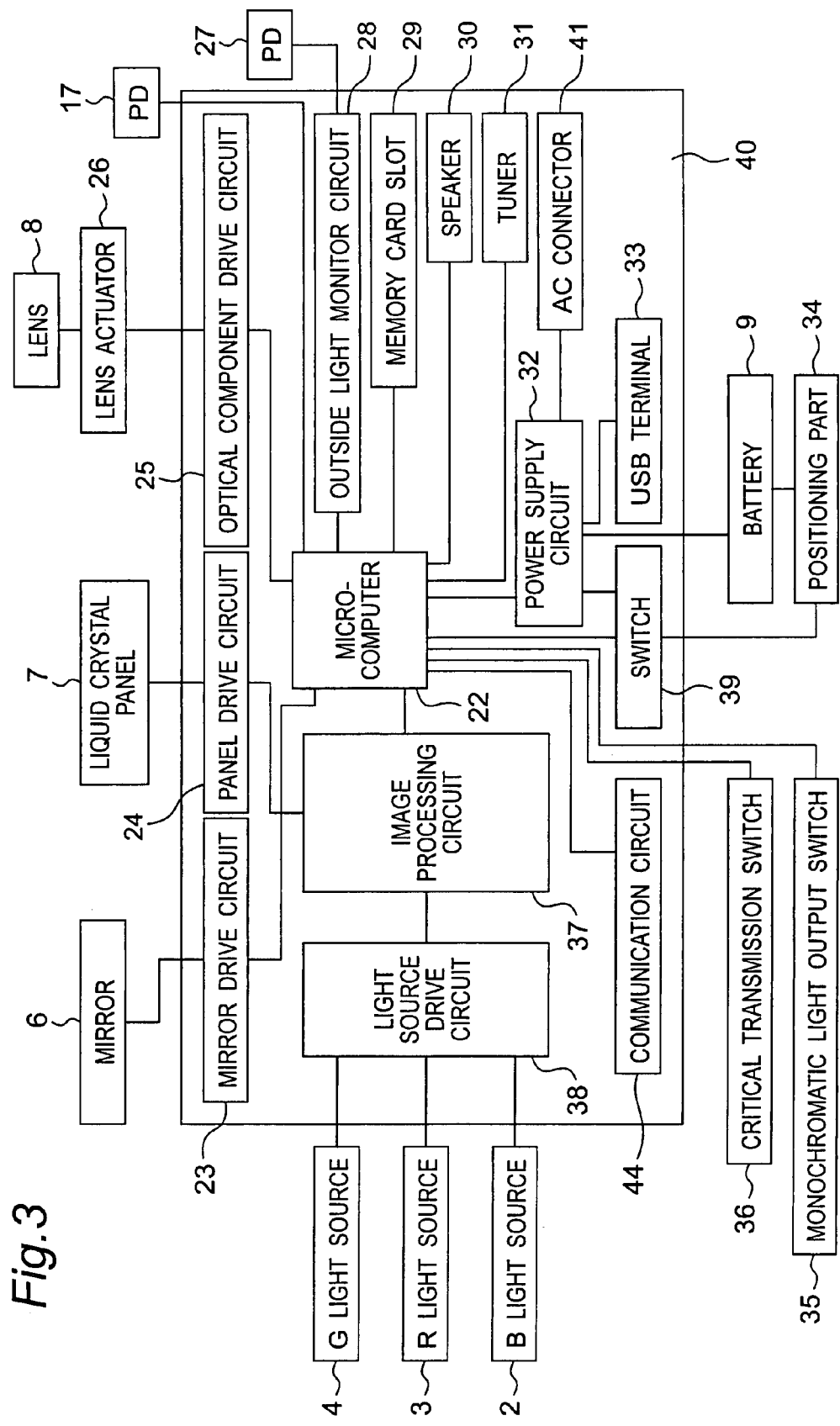
FIG. 3 is a block diagram of the light source device for a display device according to the first embodiment of the present invention.

The outline of the configuration of the light source device for a display device according to the first embodiment of the present invention will be described using FIGS. 1 to 3. FIG. 1 is a schematic view showing an approximate configuration of a light source device 1 according to the first embodiment of a case of when a normal image is projected onto a screen 21 from the front plane on the same side as the viewing side. FIG. 2 is a schematic view showing a case of when a mirror reversed image is projected onto screen 21 from the rear plane on the opposite side to the viewing side by light source device 1. FIG. 3 is a block diagram showing the configuration of light source device 1. The light source device 1 includes a light source unit for outputting light, an image outputting unit for outputting an image by giving an image signal to the light, and a projecting unit operable to project the image onto screen 21, and thus can independently project the image onto screen 21. Specifically, the light source unit includes a red light source 2, a blue light source 3, and a green light source 4. The image outputting unit includes a liquid crystal panel 7. The projecting unit includes an exit lens 8 for projecting the image onto the screen. Furthermore, light source device 1 includes dichroic mirrors 5a to 5c, and a galvano mirror 6 in the order on a light path that guides the light from the light source unit to the image outputting unit. The light source device 1 also includes a battery 9 and a control circuit 40 for controlling each component. The control circuit 40 controls the image signal given at liquid crystal panel 7 of the image outputting unit, and outputs a normal image or a mirror reversed image formed by reversing the normal image right and left from liquid crystal panel 7. Thus, light source device 1 can be switched between a front projection type in which the image is projected onto screen 21 from the front plane on the same side as the viewing side and a rear projection type in which the image is projected onto screen 21 from the rear plane on the opposite side to the viewing side.

The process of outputting an image by giving an image signal to the light output from the light source unit, and projecting the image onto the screen in light source device 1 will now be described. The laser light is output from red light source 2, blue light source 3, and green light source 4 of the light source unit, and the laser light is guided to galvano mirror 6 using dichroic mirrors 5a to 5c. Galvano mirror 6 vibrates while changing the angle at high speed, and irradiates the incident laser light to the surface of liquid crystal panel 7, which is the image outputting unit, at an even amount of light. The laser light transmits through liquid crystal panel 7 of the image outputting unit, so that the image given the image signal is output. Such image is projected onto screen 21 via exit lens 8, which is the projecting unit.

Each component of light source device 1 will now be described.

The semiconductor laser is used for red light source 2 (oscillation wavelength around 640 nm) and blue light source 3 (oscillation wavelength around 440 nm), which are light source units. The semiconductor laser is ideal as the light source for portable display device (hereinafter referred to a mobile display) since significant reduction in power consumption and heat generation of light source device 1 is achieved due to the efficiency of converting power to light greater by a several times compared to the lamp. Second Harmonic Generation (SHG) laser is used for green light source 4. The SHG laser wavelength converts the exit light from the semiconductor laser having wavelength of 1064 nm to ½ the wavelength or 532 nm using a wavelength conversion device, and outputs a green light. Ideally, the semiconductor laser is also used for the green light source, but the SHG laser is used in the present embodiment since the long-term reliability thereof is not yet assured at the present time. This, however, does not limit the light source, and the semiconductor laser for green may also be used. The design of the optical components in light source device 1 is simpler compared to when the lamp is used, and the optical system can be miniaturized since a light source such as semiconductor laser or SHG laser in which the oscillation wavelength spectrum is limited is used as the light source unit in light source device 1 for display device, whereby the size of light source device 1 also becomes very small or 80 mm(length)×60 mm(width)× 30 mm(height). LED may be used for the light source, but the semiconductor laser is preferably used since low power drive can be realized in view of conversion efficiency from power to light.

In the first embodiment, the semiconductor laser applied with high frequency superposition is used as red light source 2 and blue light source 3 in order to suppress the speckle noise generated when a coherent light source is used for the light source. Through the application of such high frequency superimposition, the oscillation spectrum (half bandwidth of vertical mode) of the exit light from the semiconductor laser can be increased to 3 nm or more and the interference can be suppressed, whereby the interference on the screen is reduced and the generation of speckle noise is eliminated. Similar effects are also obtained by using a self exciting oscillation type semiconductor laser instead of applying the high frequency superposition to the semiconductor laser. The vertical mode spectrum width of the self exciting oscillation type semiconductor laser of 3 nm (half value) or more is preferably used.

Transmissive liquid crystal panel 7 is used for the image outputting unit for outputting an image by giving an image signal to the light output from light source units 2, 3, and 4 in light source device 1 of the first embodiment. However, the image outputting unit is not limited to transmissive liquid crystal panel 7, and devices using a mirror, such as a reflective liquid crystal device, or a Digital Micromirror Device (DMD) may be used.

A polarizing beam splitter 18, a λ/4 plate 19, PD 17, and a lens actuator 26 are used in focal adjustment to be hereinafter described. Each component of light source device 1 is controlled by incorporated control circuit 40.

Supply of power to each component and the light source of light source device 1 is carried out by battery 9. The light source device 1 may supply power to the drive circuit or the light source in the light source device when connected to a plug outlet, but can also be used outdoors or in areas where plug outlets are not available since a drive battery is incorporated and battery drive can be performed.

Each component of control circuit 40 of light source device 1 will now be described using the block diagram of FIG. 3. A microcomputer 22 arranged on control circuit 40 controls the operation of each component of light source device 1. A mirror drive circuit 23 drives galvano mirror 6. A panel drive circuit 24 controls the drive of liquid crystal panel 7. An optical component drive circuit 25 is used in focal adjustment to be hereinafter described. The light output that is output from light source device 1 is adjusted according to the size of the outside light by a PD 27 and an outside light monitor circuit 28. Thus, when the light source device 1 is driven by a battery, an advantage of suppressing light output in a dark room and suppressing power consumption is obtained, whereby a long-term drive can be realized. Image or voice output can be performed by a memory card slot 29 to which a memory card is inserted. Voice is output from a speaker 30. TV electric wave and radio electric wave are received by a tuner 31. Information from the TV or the radio thus can be obtained even when outside. Power supply to light source device 1 is managed by a power supply circuit 32. The power supply source includes an AC connector 41, a USB terminal 33, and battery 9. The power supply circuit 32 determines from which power supply source the power is being supplied, and performs an optimal power supply management. When light source device 1 is incorporated as a component of display device 10, as described hereinafter, whether or not power supply is being made from display device 10 through a positioning part 34 is recognized by power supply circuit 32. Connection is made to the personal computer by way of USB terminal 33 and the like to output images and voices, but the USB terminal may used also be as the power supply source, as described above. If image or voice signal is not being output from the personal computer and the like, battery 9 can be charged through USB terminal 33. The positioning part 34 is used to connect to the main body of display device 10 to be hereinafter described.

When light source device 1 is incorporated as the component of display device 10 by a switch 39, connection to the main body of display device 10 is recognized, and various settings of light source device 1, such as driving method, are switched. A monochromatic light is output from light source device 1 by a monochromatic light output switch 35. Monochromatic light referred to herein does not mean that there is only one light wavelength but means that the output image is even at the entire surface, and refers to substantially the same color. When monochromatic light output switch 35 is turned ON, a white light etc. is output, and thus can be used as a flashlight at night. The microcomputer 22 recognizes when monochromatic light output switch 35 is turned ON, and the light is output from light source device 1 even if the image signal is not input from an external device. Furthermore, the user of light source device 1 can notify the critical situation to another user by a critical transmission switch 36. When critical transmission switch 36 is turned ON, display of "SOS" or "HELP" etc. is output. The signal is output using a communication circuit 44 when critical transmission switch 36 is turned ON, thereby notifying the critical situation to another user. An image processing circuit 37 processes image signals, and transmits the signals to panel drive circuit 24 and light source drive circuit 38. The light source drive circuit 38 is a circuit for performing output setting and output stabilization of light sources 2 and 3.

Second Embodiment

Figure 4:
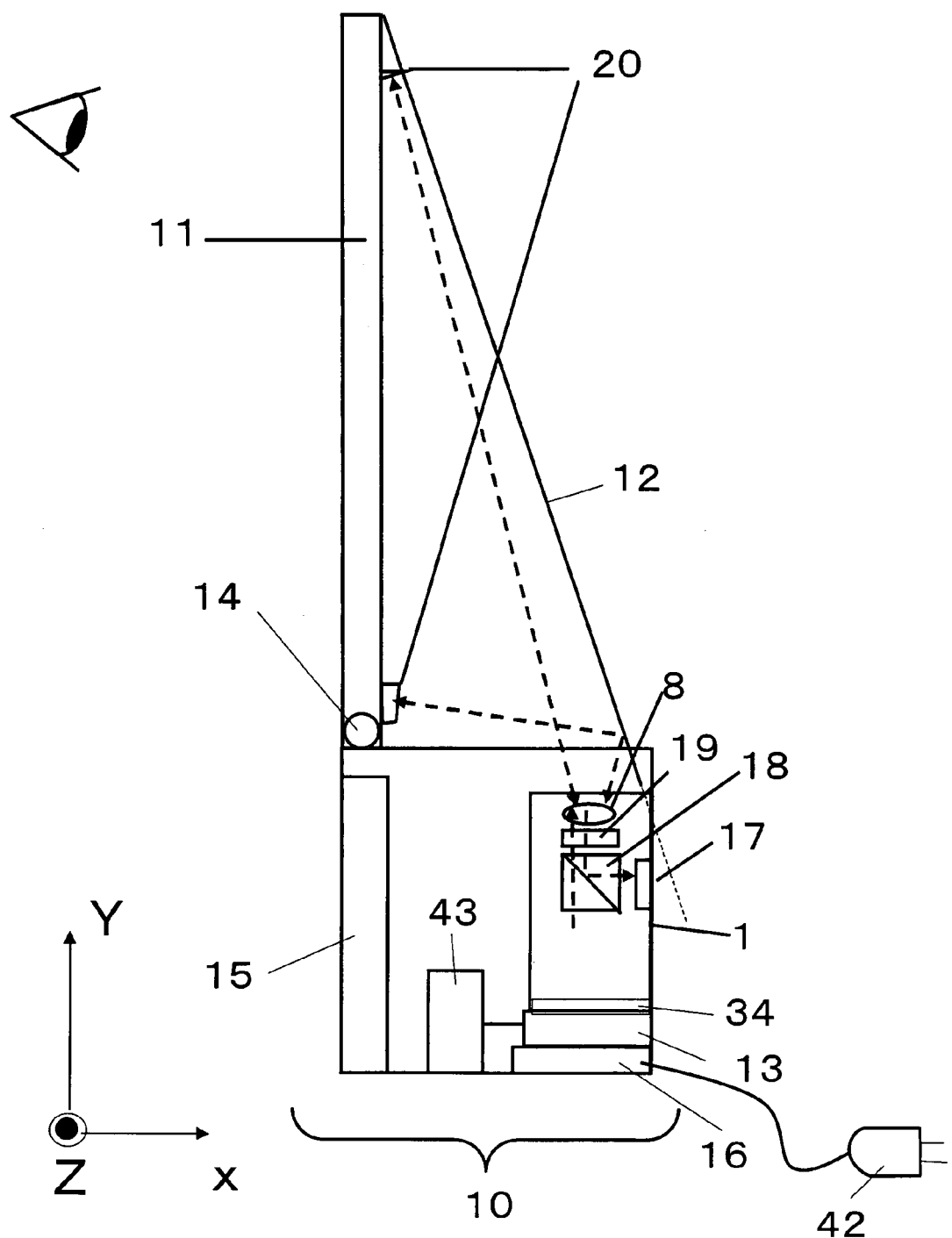
FIG. 4 is a schematic view showing the configuration of the display device according to a second embodiment of the present invention.

FIG. 4 is a schematic cross sectional view showing the configuration of display device 10 according to a second embodiment of the present invention. The display device 10 according to the second embodiment of the present invention includes light source device 1 of the first embodiment, a screen 11 operable to project the image, a reflecting mirror 12 operable to reflect the image from light source device 1 and directing the same towards screen 11, a positioning unit 13 operable to determine the relative position of light source device 1 and screen 11, a folding movable part 14, a keyboard 15 and a charging substrate 16.

Figure 5:
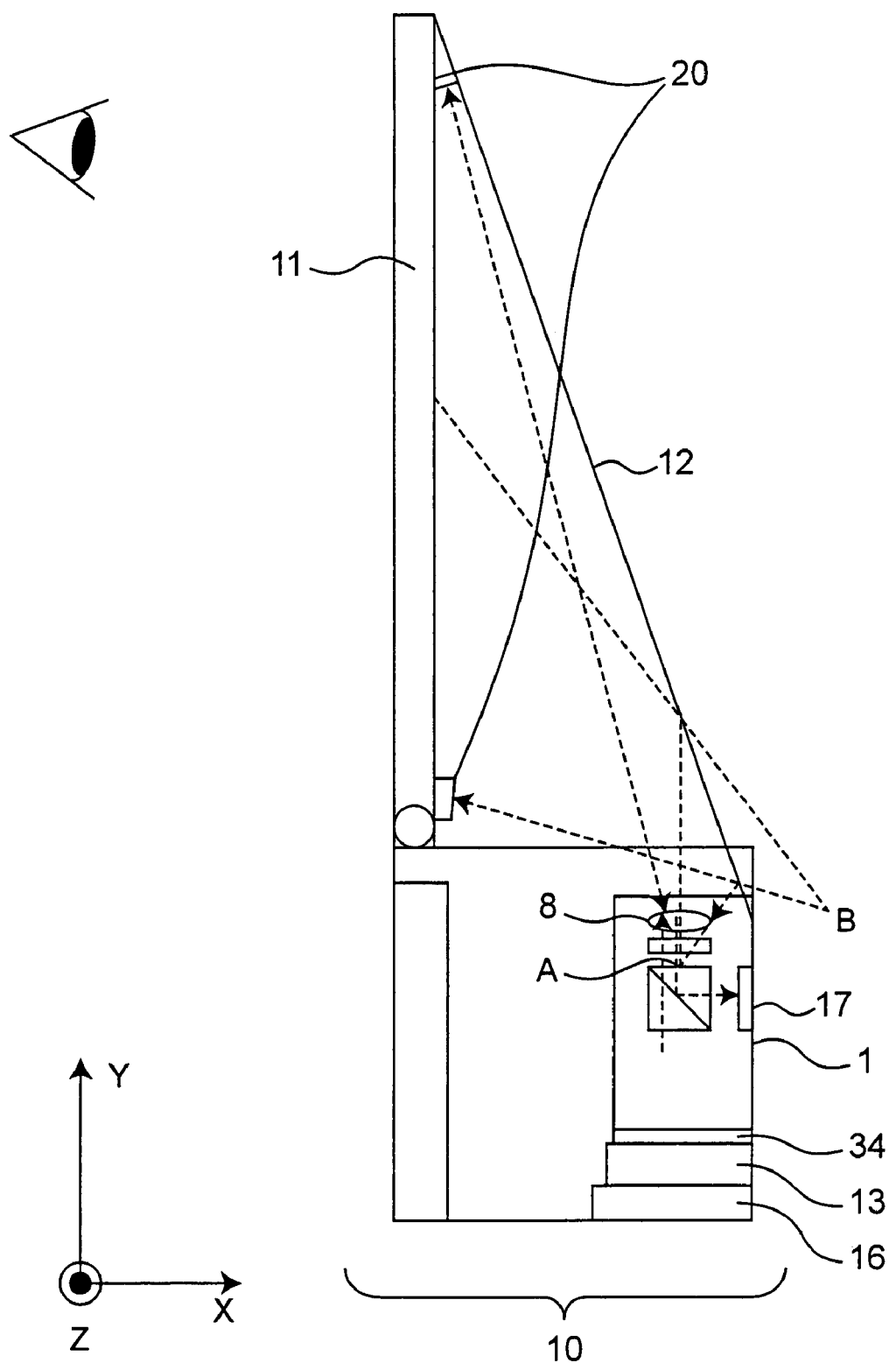
FIG. 5 is a schematic view showing the arrangement of the light source device in the display device according to the second embodiment of the present invention.

The light source device 1 is used in the rear projection type, and reflecting mirror 12 is arranged in display device 10, as shown in FIG. 4. The arrangement of light source device 1 will be described using FIG. 5. FIG. 5 is a schematic view showing the virtual arrangement of the light source device (focus B) when reflecting mirror 12 is not used and the arrangement of light source device 1 (focus A) when reflecting mirror 12 is used. In the case of the rear projection type as shown in FIG. 2, for instance, a sufficient space is required on the rear plane side of screen 21 compared to the front projection type of FIG. 1, and thus the relevant arrangement is actually difficult to ensure. A configuration of arranging light source device 1 diagonally below or diagonally above the screen is thus considered to reduce the space occupying the rear plane side of the screen as much as possible. Such arrangement includes virtually arranging the light source device (not shown) having the focus at point B of FIG. 5. However, a substantial amount of space is still required on the rear plane side even in such arrangement. The reflecting mirror 12 is thus additionally arranged in display device 10, and light source device 1 is arranged so as to have focus A at a position mirror symmetric to focus B with respect to reflecting mirror 12, as shown in FIG. 5. The image is then rear plane projected onto screen 11 as if rear plane projecting the image from focus B, and the space occupying the rear plane side is reduced. The mirror reversed image formed by reversing the normal image right and left must be rear plane projected when rear plane projecting from focus B. The normal image is rear plane projected from light source device 1 at focus A if reflective mirror 12 is used since the image is mirror reversed by reflecting mirror 12.

Each component of display device 10 will now be described. First, light source device 1 is light source device 1 of the first embodiment, and thus description on the configuration thereof will be omitted. A semi-transmissive film is used for screen 11. The display device 10 includes positioning unit 13 to accurately position light source device 1. The light source device 1 is thereby positioned using positioning part 34 of light source device 1 itself and positioning unit 13 of display device 10 main body. The positions of the image projected from the light source device 1 to screen 11 in the horizontal direction (x-z direction) and in the vertical direction (y direction) are properly positioned by fine tuning the position of the light source device 1 with positioning unit 13. The charging substrate 16 is arranged under positioning unit 13, so that battery 9 in light source device 1 can be charged when light source device 1 is connected to positioning unit 13. The light source device 1 may be immediately used alone when separated from display device 10 since charging substrate 16 is arranged. When positioning part 34 recognizes the connection to positioning unit 13 in light source device 1, switch 39 is activated and controlled to charge battery 9. A power supply cable 42 is connected to charging substrate 16 to receive power supply from the plug outlet. The display device 10 can be folded and made compact by folding movable part 14. The entire display device 10 can be made compact and can be easily carried around since screen 11 is foldable.

The display device 10 further includes keyboard 15. The keyboard 15 can be detached from the main body of display device 10 for use. A channel switch, power switch etc. may be arranged on keyboard 15. When light source device 1 is used as a component of display device 10, light source device 1 can be controlled from keyboard 15. The light source device 1 thus does not need to be detached in switching the input signal of light source device 1. Furthermore, since keyboard 15 is detachable from the main body of display device 10, display device 10 can be controlled from a remote position using keyboard 15.

Figure 6:
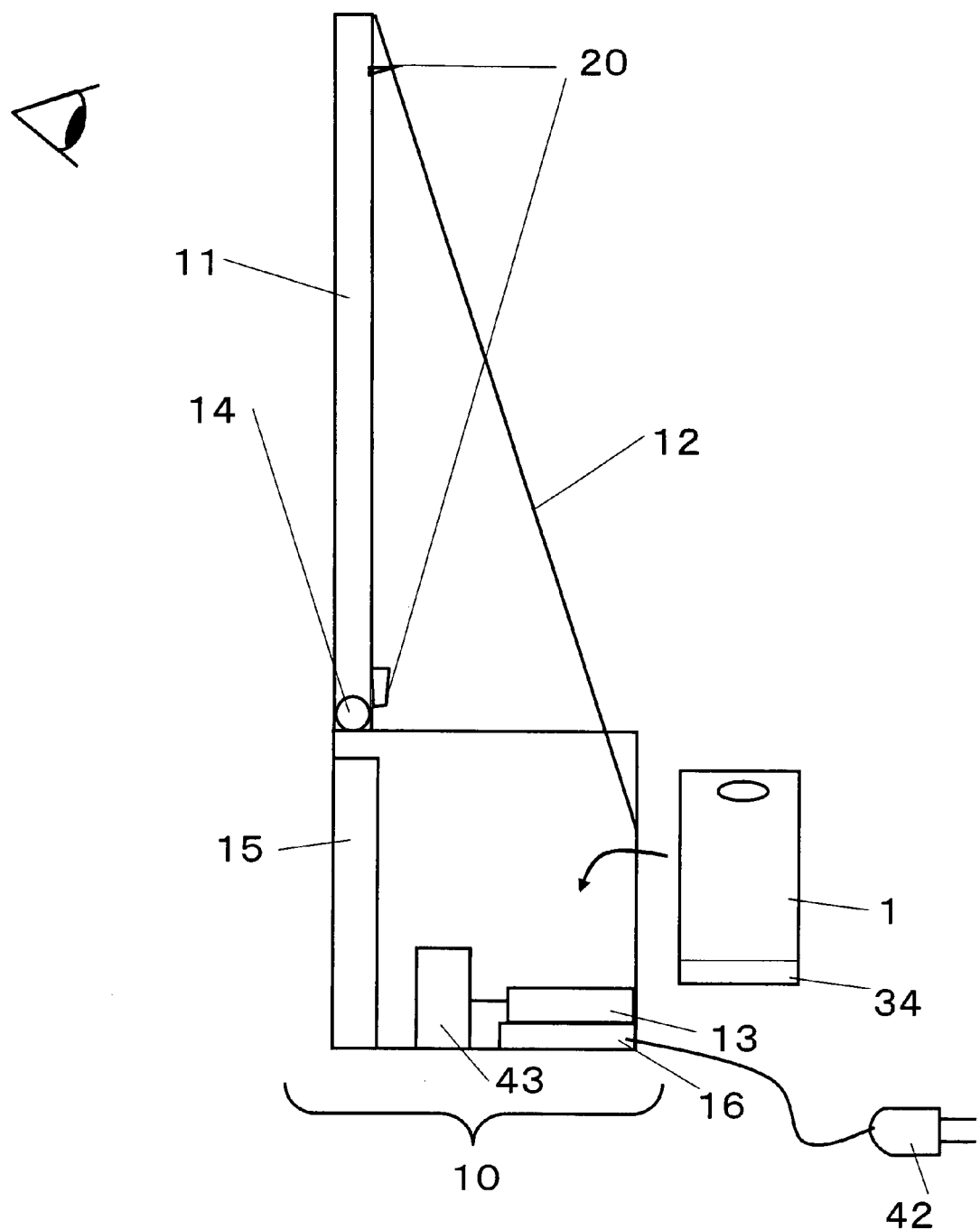
FIG. 6 is a schematic view showing an example of incorporating the light source device as a component of the display device.

Furthermore, when light source device 1 is incorporated as the component of display device 10, as shown in FIG. 6, relevant display device 10 is recognized and various settings in light source device 1 are switched by switch 39 of light source device 1. For instance, if light source device 1 is separated from display device 10 for use, voice can be output from speaker 30 in light source device 1. If light source device 1 is used as a component of display device 10, switch 39 in light source device 1 is activated, and the voice is output from the speaker of display device 10. The light output from light source device 1 is also switched when switch 39 is activated, and controlled to the optimum output to be projected onto screen 11.

Moreover, if light source device 1 is used as the front projection type by itself, a normal image is projected onto the screen. In the rear projection type display device that does not use the reflecting mirror, however, the mirror reversed image formed by reversing the normal image right and left must be rear plane projected onto the screen. If light source device 1 is incorporated in the display device in this case, switch 39 is activated, and the settings are changed so as to rear plane project the mirror reversed image onto the screen. In this case, the image signal is reversed right and left in image processing circuit 37 and is output to panel drive circuit 24, and the mirror reversed image formed by reversing the normal image right and left (in some cases, also turned upside down) in liquid crystal panel 7 or the image outputting unit is output.

Information necessary for image adjustment is stored in an image information circuit 43 in display device 10, and the image adjustment can be performed in light source device 1 based on such information. The image adjustment complying with each display device can be performed when the light source device is incorporated in the display device having different configurations by arranging image adjustment information circuit 43 in each display device. Normally, the image adjustment optimizing method often differs in the case of the display devices equipped with screen 11 of different size and shape. Optimization is achieved even in such cases based on the information of image adjustment information circuit 43, and image adjustment can also be performed when light source device 1 is incorporated in display devices 10 equipped with different screens 11.

The automatic image adjustment function of display device 10 will now be described. When light source device 1 is separated from the display device, and used alone as a light source device for display device of front projection type, the distance between light source device 1 and the screen becomes different from when incorporated in display device 10. Thus, the position of exit lens 8 often differs between the stand-alone light source device and display device 10. The relative position of exit lens 8 must be returned to the optimum position for the display device when light source device 1 is incorporated as the component of display device 10. The image adjustment function of display device 10 exerts the effect when light source device 1 is separated from display device 10 to be used alone, when again incorporated as the component of display device 10, or when incorporated in a different display device. The method for adjusting the image includes the following three methods.

The first method for adjusting the image is a method of moving exit lens 8 to a stored optimum position according to the optimum position of exit lens 8 stored in advance for every display device 10 in light source device 1. The optimum image adjustment is thereby performed. The first method is a method of storing the optimum position of exit lens 8 for every display device in microcomputer 22 used in control circuit 40 of light source device 1, and automatically moving the position of exit lens 8 to the stored optimum position when light source device 1 is connected to display device 10. When again connecting light source device 1, which was used separated from display device 10, to display device 10 for use, a signal recognizing that light source device 1 has been connected to display device 10 by the terminal arranged at positioning part 34 is transmitted to control circuit 40 in light source device 1 via switch 39, and the signal is transmitted to lens actuator 26 arranged in the vicinity of exit lens 8 from control circuit 40 via optical component drive circuit 25. The exit lens 8 is then moved by lens actuator 26 to the position at where the focal position of exit lens 8 becomes optimum.

In most cases, the focal position and left, right, top, and bottom positions are correctly adjusted by the first method, but the second method for adjusting the image described below is effective if the optical component is displaced.

Figure 7A:
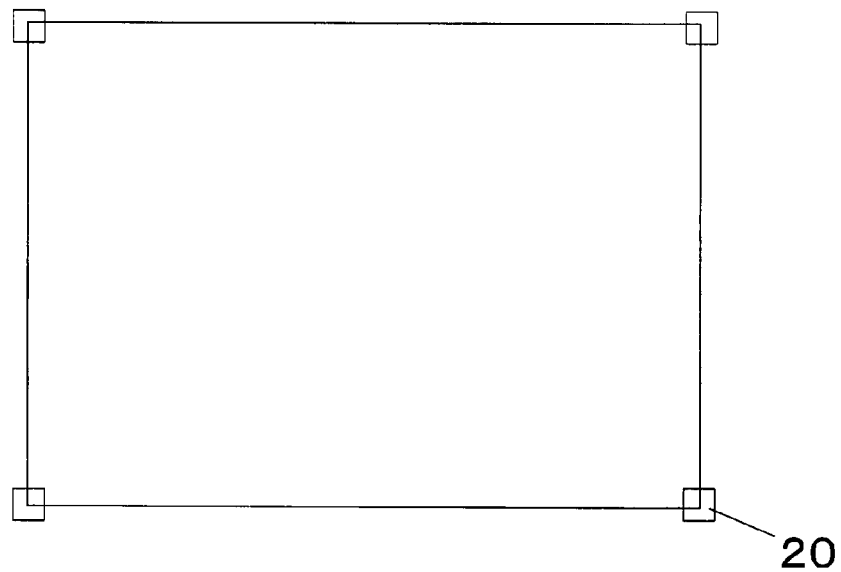
FIG. 7A is a schematic view showing the relationship between reflectors arranged on the outer frame of the screen and an image adjusting pattern or a square pattern.
Figure 7B:
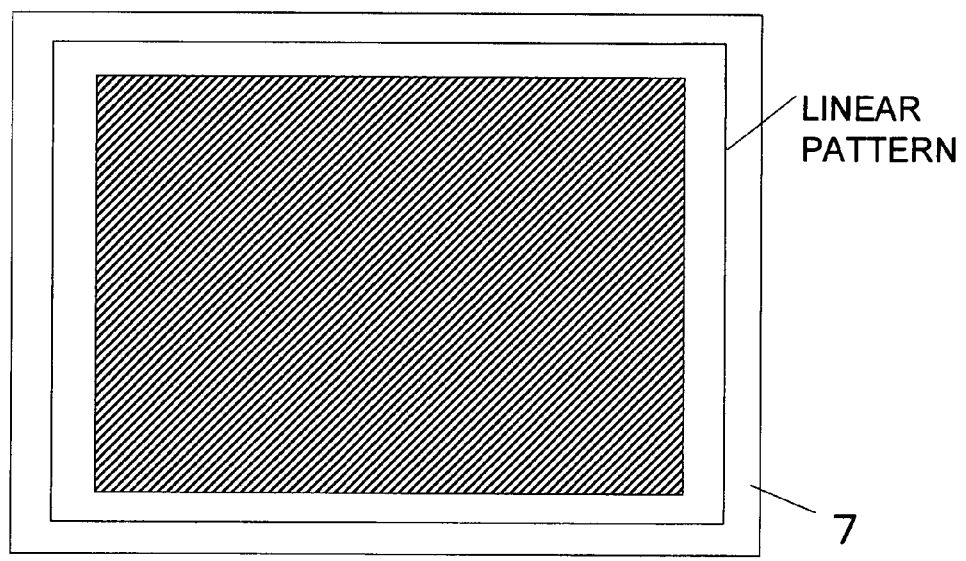
FIG. 7B is a schematic view showing the relationship between the image in the liquid crystal panel and the image adjusting pattern or a square pattern.

The second method for adjusting the image will be described using FIGS. 4, 7A, and 7B. In the second method, the position of exit lens 8 is returned to the optimum position using the reflected light from screen 11. FIG. 4 is a schematic view showing the configuration of display device 10 described above, and shows the x-y direction parallel to the plane of drawing and the z direction perpendicular to the plane of drawing as the adjusting directions of light source device 1. FIG. 7A is a schematic view showing the relationship between a square pattern or the image adjusting pattern to be projected onto screen 11 and a reflector 20 arranged on screen 11. FIG. 7B is a schematic view showing the square pattern or the image adjusting pattern with the image adjustment signal given only to the outermost periphery of the image portion in liquid crystal panel 7 or the image outputting unit. In the second method, the square pattern is projected onto screen 11 as the image adjusting pattern, the reflected light is received from reflector 20 arranged on screen 11, and exit lens 8 is moved to the optimum position based on the reflective light.

In FIG. 4, the light exited from the light source in the light source device 1 is transmitted through polarizing beam splitter 18 via liquid crystal panel 7 and transmitted through the λ4 plate 19, and thereafter, irradiated onto screen 11. The image of square pattern as shown in FIG. 7A is output from light source device 1. The square pattern is created using cells near the outermost periphery of liquid crystal panel 7 as shown in FIG. 7B. The shaded portion on liquid crystal panel 7 is the portion to be projected onto screen 11 as image. Other portions are projected to frame of screen 11. The square pattern cannot be seen from the user's side. The square pattern is formed using the red light source having the largest PD sensitivity among red, green, and blue. Four reflectors 20 are arranged on screen 11 in correspondence to the square pattern as shown in FIG. 7A, and the light of the apex portion of the square pattern irradiated from light source device 1 is reflected to light source device 1 as returned light. The left, right, top, and bottom positional relationship of the image and whether or not trapezoidal correction is necessary are determined by arranging four reflectors 20 on the outer frame of screen 11.

The lights reflected by reflectors 20 on the outer frame of screen 11 enter light source device 1, and enter polarizing beam splitter 18 after being transmitted through the λ/4 plate 19. The lights that return by being reflected by reflectors 20 are transmitted through the λ/4 plate 19 twice, and thus the polarizing angle is rotated by 90° and the optical path is bent by 90° by polarizing beam splitter 18 and entered into PD 17. The intensity and the spot size of the reflected light entering PD 17 are detected, and exit lens 8 is adjusted to the optimum position using optical component drive circuit 25 and lens actuator 26 according to the obtained intensity and the spot size of the reflected light. The light thus has an optimum spot shape on screen 11. According to the automatic image adjustment function described above, a clear image can be seen without the user performing the position adjustment of exit lens 8 when connecting light source device 1 to display device 10.

Only fine tuning of exit lens 8 of light source device 1 is performed in the first and second method for adjusting the image, and a third image adjusting method for adjusting the image output from liquid crystal panel 7 or the image outputting unit will be further described below.

The third method for adjusting the image will be described using the flowchart of FIG. 8. In the third method, the image adjusting pattern is output from liquid crystal panel 7 of the display device and projected onto the screen arranged with the reflectors and the reflected light is received, where the image adjusting pattern is image adjusted according to the reflected light. The method for adjusting the image includes, step (S01) of outputting the image adjusting pattern with the image adjustment signal given only to the outermost peripheral portion of the image from image outputting unit 7 of light source device 1;
step (S02) of receiving the reflected light of the image adjusting pattern reflected from reflecting part 20 of screen 11;
step (S03) of performing image adjustment of the image adjusting pattern according to the received reflected light; and
step (S04) of determining whether or not the image adjustment is within a predetermined acceptable range. According to such method for adjusting the image, the step of outputting the image adjusting pattern from the image outputting unit to the step of performing the image adjustment are repeated until the image adjustment is within the acceptable range.

Figure 9:
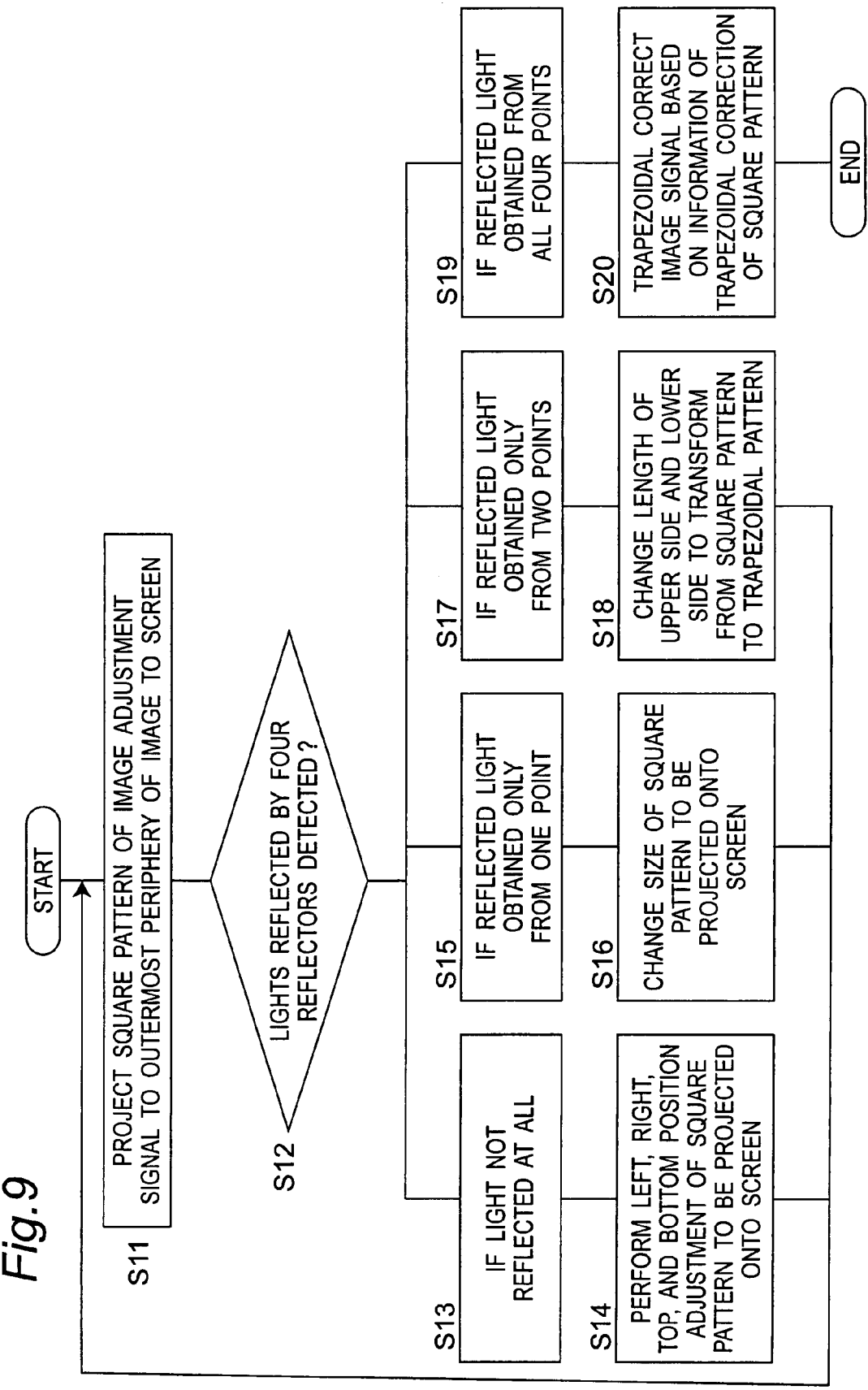
FIG. 9 is a flowchart of a more detailed method for adjusting the image of the display device according to the second embodiment of the present invention.
Figure 10:
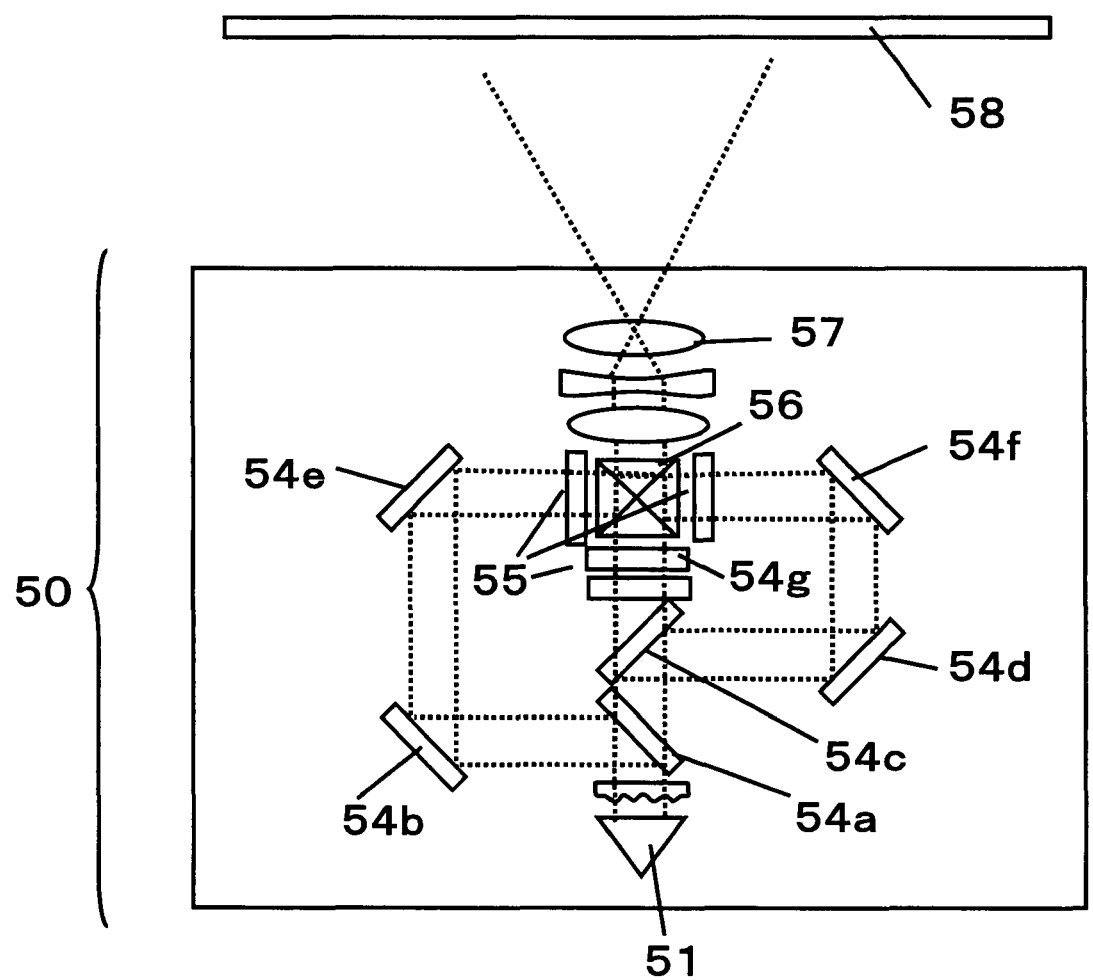
FIG. 10 is a schematic view of a conventional display device.
Figure 11:
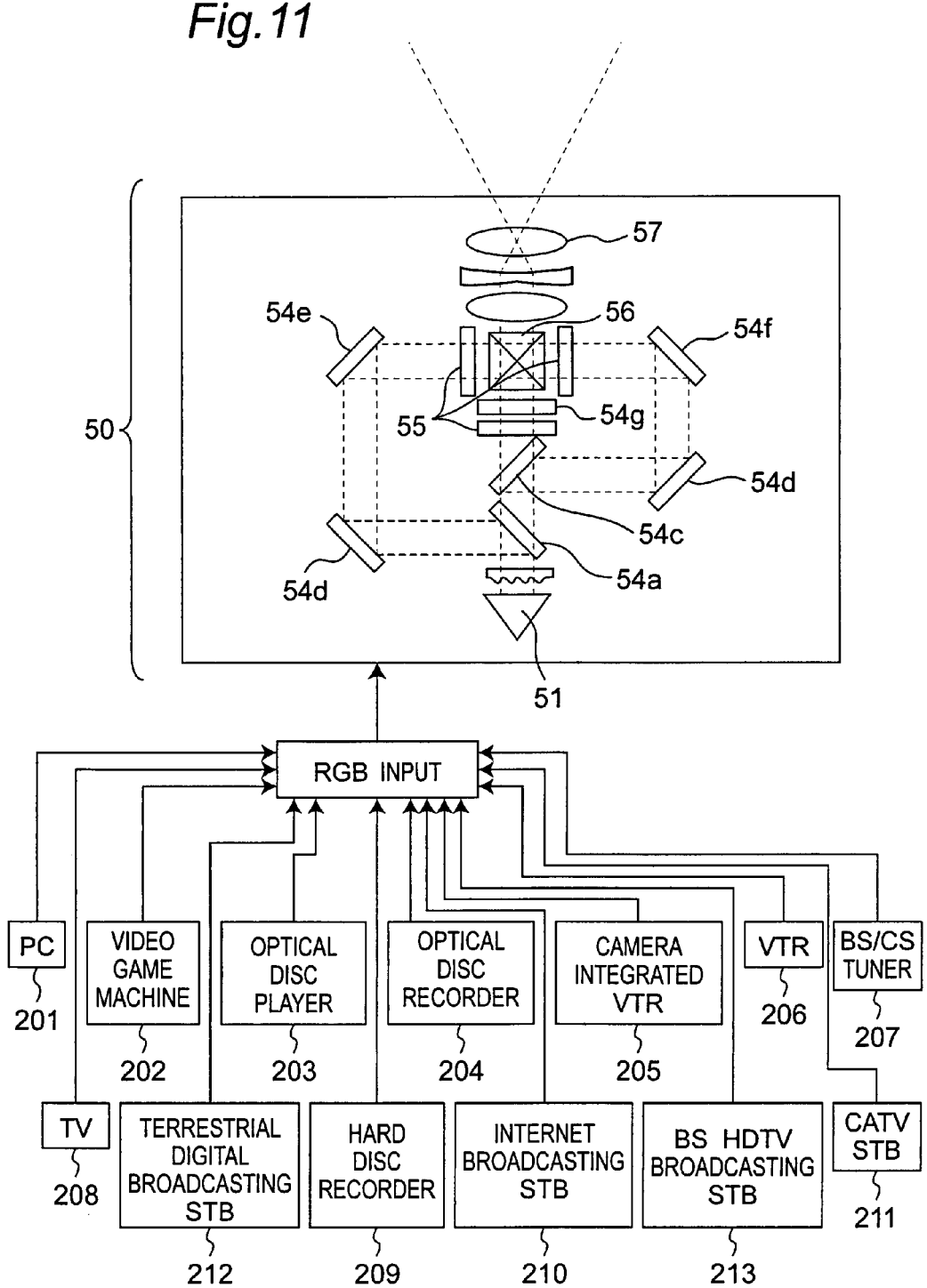
FIG. 11 is a schematic view showing equipment that can be connected to a conventional laser display.

The method for adjusting the image of display device 10 will be more specifically described using the flowchart of FIG. 9.

(a) Project a square pattern of the image adjusting pattern to the outermost periphery of the image output from light source device 1 to screen 11 (S11).

(b) Determine whether or not the lights reflected by four reflectors 20 are detected (S12).

(c) If light is not reflected from four reflectors 20 at all (S13), left, right, top, and bottom displacement of the square pattern to be projected onto the screen is assumed. The position of the positioning unit 13 is then moved in the XZ direction of FIG. 4 to perform the left, right, top, and bottom position adjustment of the square pattern to be projected onto the screen (S14). The reflected light from at least one point is thereby obtained.

(d) If the reflected light is obtained only from the reflector 20 of one point out of the four reflectors 20 (S15), the square pattern to be projected onto the screen 11 is assumed to be larger than the screen or smaller than the screen. The positioning unit 13 is thus moved up and down in the Y direction to change the size of the square pattern to be projected onto screen 11 (S16). The reflected light from at least two points is thereby obtained.

(e) If the reflected light is obtained only from reflectors 20 of two points out of four reflectors 20 (S17), the square pattern to be projected onto screen 11 is assumed as being deformed to a trapezoidal shape. The square pattern output from liquid crystal panel 7 or the image outputting unit is then controlled to change the length of the upper side and the lower side of the square pattern to the trapezoidal shape (S18). The reflected light from all reflectors 20 at four points are thereby obtained.

(f) If the reflected light from all four points are obtained from four reflectors 20 (S19), the square pattern of the image adjusting pattern is assumed to be properly projected to the outer frame of screen 11, and thus image adjustment is completed.

(g) The image signal is trapezoidal corrected based on the information that trapezoidal correction of the square pattern was performed (S20). Subsequently, the trapezoidal corrected image signal is output to liquid crystal panel 7 or the image outputting unit.

According to the above procedures of automatic image adjustment, the image signal can be appropriately trapezoidal corrected, and non-deformed image can be projected onto screen 11.

The display device according to the present invention is effective as a display device, communication equipment, and the like.

The invention claimed is:

1. A light source device for a display device for projecting an image on a screen, the screen including a front and a rear, the front being the same side as a viewing side and the rear being a side opposite the viewing side, the light source device comprising:
    a light source unit operable to output light;
    an image outputting unit operable to output an image by supplying an image signal to the light; and
    a control circuit operable to switch the image output from the image outputting unit between a normal image and a mirror reversed image formed by reversing the normal image right and left by controlling the image signal, such that an outputting type is capable of being switched between a front projection in which the image is projected onto the screen from the front, and a rear projection in which the image is projected onto the screen from the rear,
    wherein the control circuit switches projecting light output according to a projection type between front projection and rear projection;
    wherein the light source unit includes a semiconductor laser; and
    wherein the control circuit switches the projecting light output according to surrounding brightness.

2. The light source device for a display device according to claim 1, further comprising a projecting unit operable to project the normal image or the mirror reversed image output from the image outputting unit onto the screen.

3. The light source device for a display device according to claim 1, wherein the control circuit further includes a switch operable to switch between front projection and rear projection.

4. The light source device for a display device according to claim 3, wherein the control circuit outputs the normal image or the mirror reversed image from the image outputting unit in response to the state of the switch.

5. The light source device for a display device according to claim 1, wherein the control circuit performs trapezoidal correction or image adjustment in the vertical and horizontal directions on the image to be projected onto the screen by controlling the image signal given at the image outputting unit.

6. The light source device for a display device according to claim 1, wherein high frequency superposition is applied to the semiconductor laser.

7. The light source device for a display device according to claim 1, wherein the semiconductor laser is a self exciting type semiconductor laser.

8. The light source device for a display device according to claim 1, further comprising a voice outputting unit operable to output voice.

9. The light source device for a display device according to claim 1, further comprising a communication unit.

10. The light source device for a display device according to claim 1, wherein the control circuit is operable to output a monochromatic pattern signal.

11. The light source device for a display device according to claim 1, wherein the control circuit outputs an image pattern signal for notifying a critical situation in the time of a disaster.

12. The light source device for a display device according to claim 1, further comprising a drive battery.

13. The light source device for a display device according to claim 12, wherein the control circuit switches the light output according to the remaining amount of the battery when used as the front projection type.

14. A display device comprising:
the light source device according to claim 1; and
a screen operable to display an image projected from the light source device.

15. The display device according to claim 14, further comprising a positioning unit operable to position a relative position of the light source device and the screen.

16. The display device according to claim 14, wherein the screen includes a reflecting part operable to reflect the image from the light source device.

17. The display device according to claim 16, wherein the reflecting part is arranged at an outermost periphery of the screen.

18. The display device according to claim 17, wherein the image outputting unit of the light source device is operable to output an image adjusting pattern with an image adjustment signal supplied to the outermost periphery of the image from the image outputting unit.

19. The display device according to claim 18, wherein the light source device further includes a light receiving unit operable to receive light reflected from the reflecting part of the screen, wherein
the control circuit performs image adjustment of the image adjusting pattern output from the image outputting unit according to the reflected light received by the light receiving unit.

20. The display device according to claim 14, wherein the switch of the light source device is operable to recognize the display device when the light source device is incorporated as a component of the display device, and switch various settings.

21. The display device according to claim 20, wherein the outputting type of the light source device is switched between front projection and rear projection according to the display device by the switch.

22. The display device according to claim 14, further comprising an input keyboard.

23. The display device according to claim 14, further comprising a charging unit operable to charge the light source device.

24. An image adjustment method for adjusting the image projected on a screen in the display device according to claim 16, the method comprising:
outputting an image adjusting pattern with an image adjustment signal supplied only to the outermost peripheral portion of the image from the image outputting unit of the light source device;
receiving a reflected light of the image adjusting pattern reflected from a reflecting part of the screen;
performing image adjustment of the image adjusting pattern according to the received reflected light; and
repeating from outputting the image adjusting pattern to performing the image adjustment, until the image adjustment is within the acceptable range.

25. The image adjustment method of the display device according to claim 24, wherein the image adjustment signal pattern is a square pattern.

* * * * *